United States Patent
Berzowski

(10) Patent No.: US 6,902,033 B2
(45) Date of Patent: Jun. 7, 2005

(54) PORTABLE FOLDING OBSERVATION TOWER FOR ATTACHMENT TO A VEHICLE

(76) Inventor: William E. Berzowski, 30301 SW. 198 Ave., Homestead, FL (US) 33030

( * ) Notice: Subject to any disclaimer, the term of this patent is extended or adjusted under 35 U.S.C. 154(b) by 0 days.

(21) Appl. No.: 10/065,451

(22) Filed: Oct. 18, 2002

(65) Prior Publication Data
US 2004/0074697 A1 Apr. 22, 2004

(51) Int. Cl.[7] .............................................. A01M 31/00
(52) U.S. Cl. ....................................... 182/127; 182/115
(58) Field of Search ................................. 182/127, 115; 410/140, 127; 224/405; 296/83

(56) References Cited

U.S. PATENT DOCUMENTS

| | | | |
|---|---|---|---|
| 1,960,588 A | * | 5/1934 | Jorgensen .................... 182/127 |
| 2,035,537 A | * | 3/1936 | Cowan .......................... 182/39 |
| 2,586,531 A | * | 2/1952 | Gordon ......................... 182/127 |
| 4,442,919 A | | 4/1984 | Fulcher |
| 4,800,986 A | | 1/1989 | Hayes, III |
| 5,409,081 A | | 4/1995 | Reeves |
| 5,553,762 A | * | 9/1996 | Brown ......................... 224/403 |
| 5,862,827 A | | 1/1999 | Howze |
| 5,881,839 A | * | 3/1999 | Stanley ........................ 182/116 |
| 6,347,684 B1 | | 2/2002 | Fath |

* cited by examiner

*Primary Examiner*—Alvin Chin-Shue

(57) ABSTRACT

A tower system adapted to be secured non-permanently to different sized cargo portions of a moving vehicle is disclosed. The system comprises (i) a tower structure including means to allow a user to sit on the tower; and (ii) a support member to which the tower structure is secured, the support member including front and rear channel members to which the tower is releasably secured, each channel member having two end portions, each end portion of the channel members being in contiguous relation to a device that is slidable with regard to the channel members and adapted to be secured to the channel members, each device extending from a member that is structured to be force-fit and secured against the cargo frame of the vehicle in a non-permanent manner so as to lock the support member to the cargo frame.

1 Claim, 5 Drawing Sheets

PORTABLE FOLDING OBSERVATION TOWER FOR ATTACHMENT TO A VEHICLE

BACKGROUND OF INVENTION

1. Field of the Invention

This invention relates to a portable, folding, vehicle-mountable observation tower that can be attached to a moving vehicle and safely permit a user to be positioned on the tower. More particularly, this invention relates to such a tower which can be releasably mounted to the cargo portion of any standard pickup truck without requiring any modification to the truck and which allows substantially full cargo capacity, whether the tower is in an up position or a folded and stored away position.

2. Description of Related Art

The prior art discloses a variety of collapsible towers typically used by hunters as towers which are secured to a moving vehicle, such as an ATV. Examples of various collapsible tower arrangements are illustrated in U.S. Pat. Nos. 4,800,986 and 5,409,081. The prior art also discloses various collapsible towers which are basically towed units. Illustrations of this kind of collapsible tower are shown and described in U.S. Pat. Nos. 4,442,919, 5,862,827, and 6,347,684 B1.

U.S. Pat. No. 5,881,839 illustrates one example of a collapsible hunter's stand that is mounted in a truck bed or within the cargo area of a pickup truck. One obvious disadvantage of the mobile hunter's stand illustrated in this patent is clearly illustrated on the front page of the patent, where it is obvious that the stand or collapsible tower, when in an extended (usable) position, takes up some of the available space within the cargo area of the truck. This is one of the specific disadvantages that the features of the present invention seek to overcome.

SUMMARY OF INVENTION

In accordance with the preferred features of the present invention, there is provided a portable, foldable observation tower for attachment to a movable vehicle that is adapted to be secured non-permanently via a support member to different sized cargo portions of a moving vehicle, and is further adapted to permit full usable cargo space capacity when the tower is being used, comprising: (i) a tower structure including means to allow a user to sit on the tower; and (ii) a support member to which the tower structure is secured, the support member including front and rear channel members to which the tower is releasably secured, each channel member having two end portions, each end portion of the channel members being in contiguous relation to a device that is slidable with regard to the channel members and adapted to be secured to the channel members, each device extending from a member that is structured to be force-fit and secured against the cargo frame of the vehicle in a non-permanent manner so as to lock the support member to the cargo frame.

The collapsible observation tower in accordance with the features of the present invention, in addition to overcoming some very basic disadvantages of similar tower structures that are illustrated in the prior art, provides a collapsible, portable, and adaptable observation tower that can be supported by a moving vehicle, and which in addition offers the following combination of advantages:

(i) The tower structure itself in accordance with the features of the present invention does not require being bolted or permanently secured to the vehicle or the truck bed. Therefore, no holes have to be drilled into the vehicle or truck bed. The tower is either clamped or strapped into position;

(ii) Due to the way the tower is mounted to the side rails of the vehicle, full cargo space capacity is allowed with the tower in place on the truck bed (in the cargo area);

(iii) The tower structure along with its support member in accordance with the features of the present invention permits the same tower structure to be mounted on all sized pickup trucks, e.g., compact, full-size, short-bed, long-bed, stepside, and flairside;

(iv) The tower structure and its support member can be mounted on truck cargo areas along with tool boxes that are side-mounted or cross-mounted;

(v) The tower structure and its support member can be adjusted front to back on either the side rails of the vehicle or on its permanently mounted tool boxes;

(vi) The tower structure and its support member is reachable from the tailgate portion or the rear bumper portion of the truck. Therefore, the cargo area of the truck can be fully utilized, and a user does not have to crawl under or over any portion of the tower structure and its support member to use the cargo space;

(vii) Both the tower structure and its support member can be installed and removed for storage off the truck by one person;

(viii) Both the seat portion and the folding foot platform of the tower structure are incorporated into the tower structure;

(ix) The seat portion of the tower structure includes a safety/steady rest rail that swings up for clearance and which provides a safety feature for the user;

(x) The tower structure includes a removable cooler/gear rack and a removable table top for use as a tray; and (xi) The tower structure is not only mobile, it is truly a portable structure.

In accordance with these and other objects which will become apparent hereinafter, the instant invention will now be described with particular reference to the accompanying drawings.

BRIEF DESCRIPTION OF DRAWINGS

For a fuller understanding of the invention, reference is made to the following detailed description of various preferred embodiments of this invention taken in connection with the accompanying drawings in which.

DETAILED DESCRIPTION

In the following detailed description, the tower structure system (i.e., the tower and the tower support member) in accordance with the features of the present invention is described in conjunction with its various applications. In this context, however, it should be noted that those of ordinary skill in the art will contemplate alternative applications of the subject matter according to the present invention. Furthermore, the present invention is not meant to be limited to only the applications described and illustrated herein.

Figure 1:
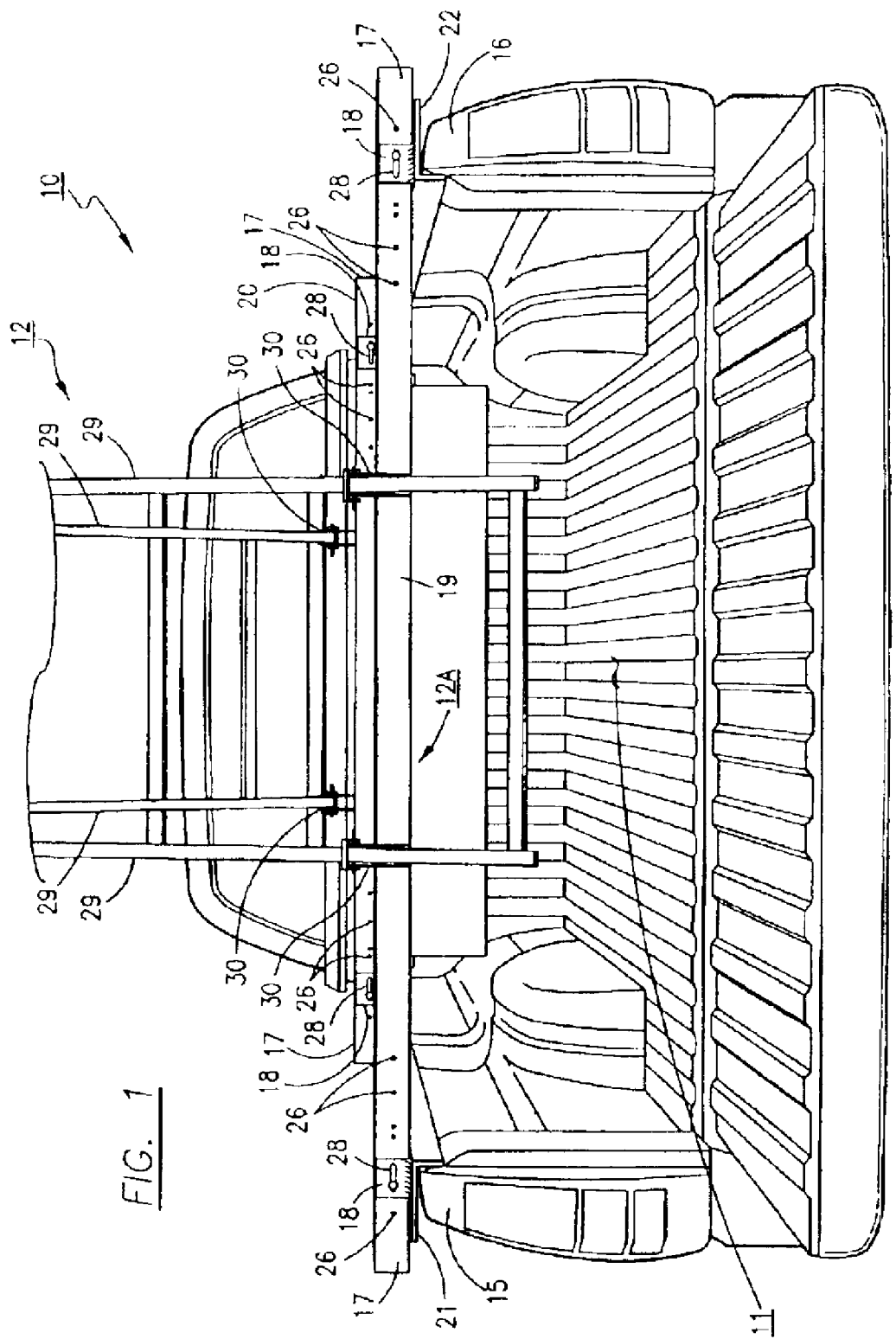
FIG. 1 is a perspective view of a cargo portion (i.e., the rear view) of a truck including the lower portion of a tower structure positioned on a support member secured on the side walls of the cargo area in accordance with the features of the present invention.

FIG. 1 clearly illustrates one of the most basic advantages of the present invention. As shown in FIG. 1, there is illustrated a truck generally referenced as 10, having a cargo area generally referenced as 11. A tower structure system in accordance with the features of the present invention is in position within cargo area 11 and is releasably secured to the cargo area 11 in a manner such that full cargo space capacity is permitted. Due to the manner by which the tower generally referenced by 12 is mounted on the truck side rails 15 and 16, the major advantages of the present invention over prior art systems are achieved. As illustrated, the tower portion 12 of the tower structure system is non-permanently secured to truck 10. Tower 12 is secured to a tower support member generally referenced by 12A which is secured to truck 10. The tower support member 12A consists of front and rear channel members 19 and 20, respectively, in combination with angle beam members 21 and 22. Each end portion 17 of each of the channel members 19 and 20 is in contiguous relation to a device 18 that is slidable with regard to the channel members and adapted to be secured to each channel member 19 and 20 at their end portions 17. Each device 18, preferably in the form of a plate member, is firmly secured and extends from each of the angle beam members 21 and 22, e.g., by welding the device to the angle beam members 21 or 22. Each angle beam member 21 or 22 is structured so as to be force-fit against one of the truck cargo side rails 15 or 16. In the embodiment illustrated in the drawings, each angle beam member 21 and 22 is formed of a right angle of about 90°, and is force-fit against an upstanding side rail 15 or 16 of the cargo area by securing the internal surface portion of each angle beam member against the inside and upper surfaces of each side rail member 15 or 16, as illustrated in FIG. 1. Each device 18 is preferably in the form of an upstanding plate member which lies in contiguous relation against the channel members 19 and 20, respectively. Each channel member 19 and 20 includes a plurality of openings (holes) 26. Holes 26 also extend through each of the channel members 19 and 20. When each angle beam member 21 and 22 is in its proper position, i.e., force-fit against the truck cargo side rail members 15 and 16, then an opening (hole) 26 on each upstanding plate member 18 is matched with a matching opening 26 on each channel member 19 and 20, and a threaded bolt fastener 28 is firmly positioned within a set of openings to firmly secure the tower support member to an individual truck cargo area to which the tower structure system in accordance with the features of the present invention is desired to be secured. Also, as illustrated in FIG. 1, each leg member 29 of tower 12 is secured to a channel member 19 and 20 by clip devices 30. The clip devices 30 can be any of various types of clip devices that can secure each of the tower legs 29 to channel members 19 and 20, but are devices that preferably form a U-shaped channel so that each clip device can locate and position a leg member 29 of tower 12 in place. Each clip 30 is retained in position by, for example, clevis pins which secure each of the vertical legs 29 of tower 12 to clip devices 30.

Figure 2:
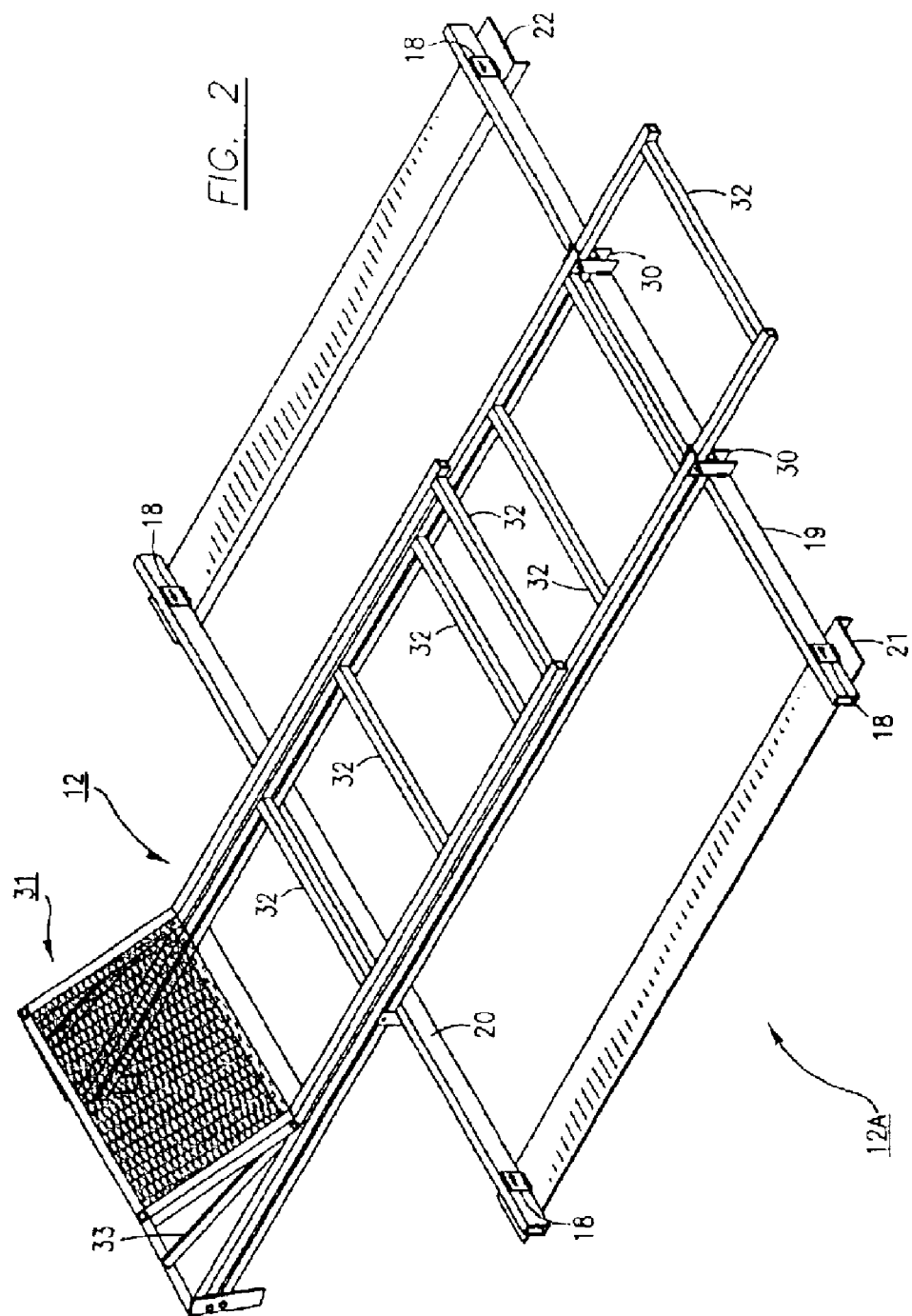
FIG. 2 is a perspective view of a tower structure and support member in a folded position ready for storage in accordance with the features of the present invention.

FIG. 2 illustrates tower 12 in a folded position (i.e., a position used for storing tower 12 including tower support member 12A when not in use). As shown, tower 12 includes a foldable seat member generally referenced by 31 and a safety bar 33 which can rotate so as to be able to fit about the upper body portion of a user, and thereby help to prevent a user from falling out of the tower when seated therein. Tower 12 includes a plurality of cross bars 32 which serve as the ladder feature of the tower, i.e., enabling a user to climb up or down the tower, when the tower is in an extended and usable position as shown in FIG. 3.

Figure 3:
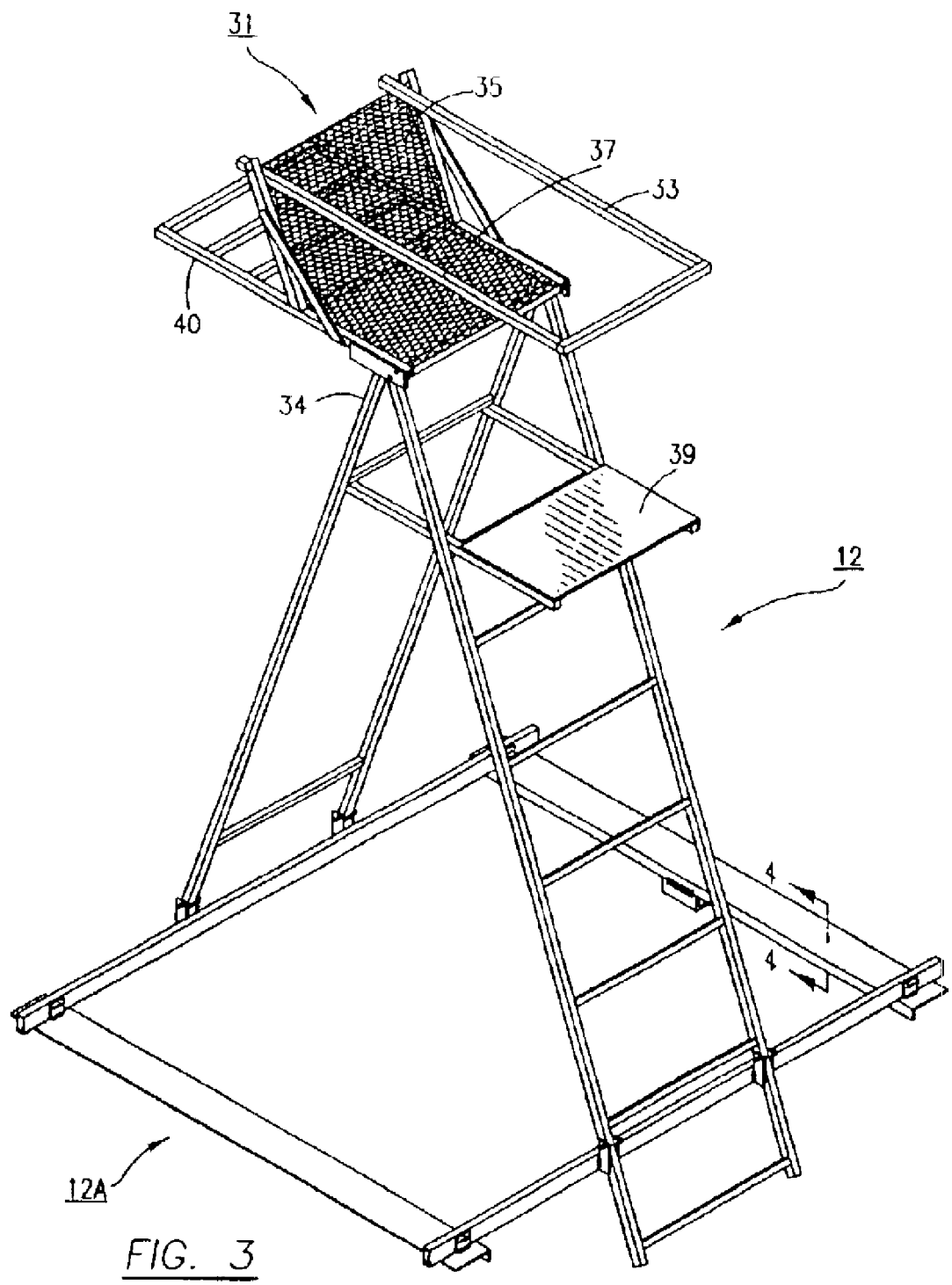
FIG. 3 is a perspective view of a tower structure and support member in an extended position, ready for being secured to a vehicle and for use in accordance with the features of the present invention.

Tower 12 is illustrated in an extended and ready-to-use position secured to tower support member 12A in FIG. 3. All that is required is that tower support member 12A be secured to the cargo area of a truck. As shown, tower 12 includes an A-frame ladder portion 34; a folding seat member 31 which includes a rear back support member 35 and a seat support member 37; a safety support rail 33 which helps prevent the user from falling out of the seat member 31 and which rotates so as to enable the user to climb down from the tower; a footrest member 39; and a tray-type storage member 40.

Various other options can be included with tower 12, depending upon the particular use of the tower, i.e., for hunting, for wild game and bird watching, for photography, for general surveillance purposes, etc. For example, items such as a cooler tray, tool tray, cup holder, gun rack, bow and arrow rack, camera holding device, etc. are just a few examples of the various options that can be included. The portable folding observation tower 12 as shown in FIG. 3 is able to be secured to a support member 12A in accordance with the features of the present invention, which then enables tower 12 to be mounted on any standard pickup truck 10 (see FIG. 1) without any modification to the truck. When tower 12 is in its folded position (see FIG. 2), one can transport the tower and its support member in the truck cargo and still be left with full cargo capacity. When in an up or extended or "in use" position (see FIG. 3), and positioned in the truck cargo (see FIG. 1), tower 12 extends about ten to twelve feet of height into the air above the truck and still leaves the truck with full cargo capacity. However, it is within the scope of the present invention that the tower 12 can extend to various other heights. Once the tower assembly is assembled and the tower is to be secured or mounted on the truck in a ready-to-use position, no bolting or unbolting is required. The user simply clamps or unclamps the tower structure from or to the truck, as needed.

The portable observation tower as defined herein is easily mounted and removed from a pickup truck to which it is easily secured, and is also completely collapsible and removable. The observation tower with its support member in accordance with the unique features of the present invention is designed to fit within and used with any standard pickup truck, short or long bed, step or flare side. The tower system can be shipped in a completely disassembled condition, and assembled at the location where it will be used. When assembled, the tower system (tower 12 and tower support member 12A) can be installed on the side rails 15 and 16 of a pickup truck (see FIG. 1). When in transport, the tower system can be locked in a collapsed position, thereby removed from any obstacles that may be encountered by the tower if it was in a totally upright (ready for use) position. When in use, the tower is locked in the upright position for a comfortable, stable, elevated seating platform with a footrest, backrest, and a steady rest for birdwatching, hunting, surveillance, or any other observation type requirements it may serve.

Figure 4:
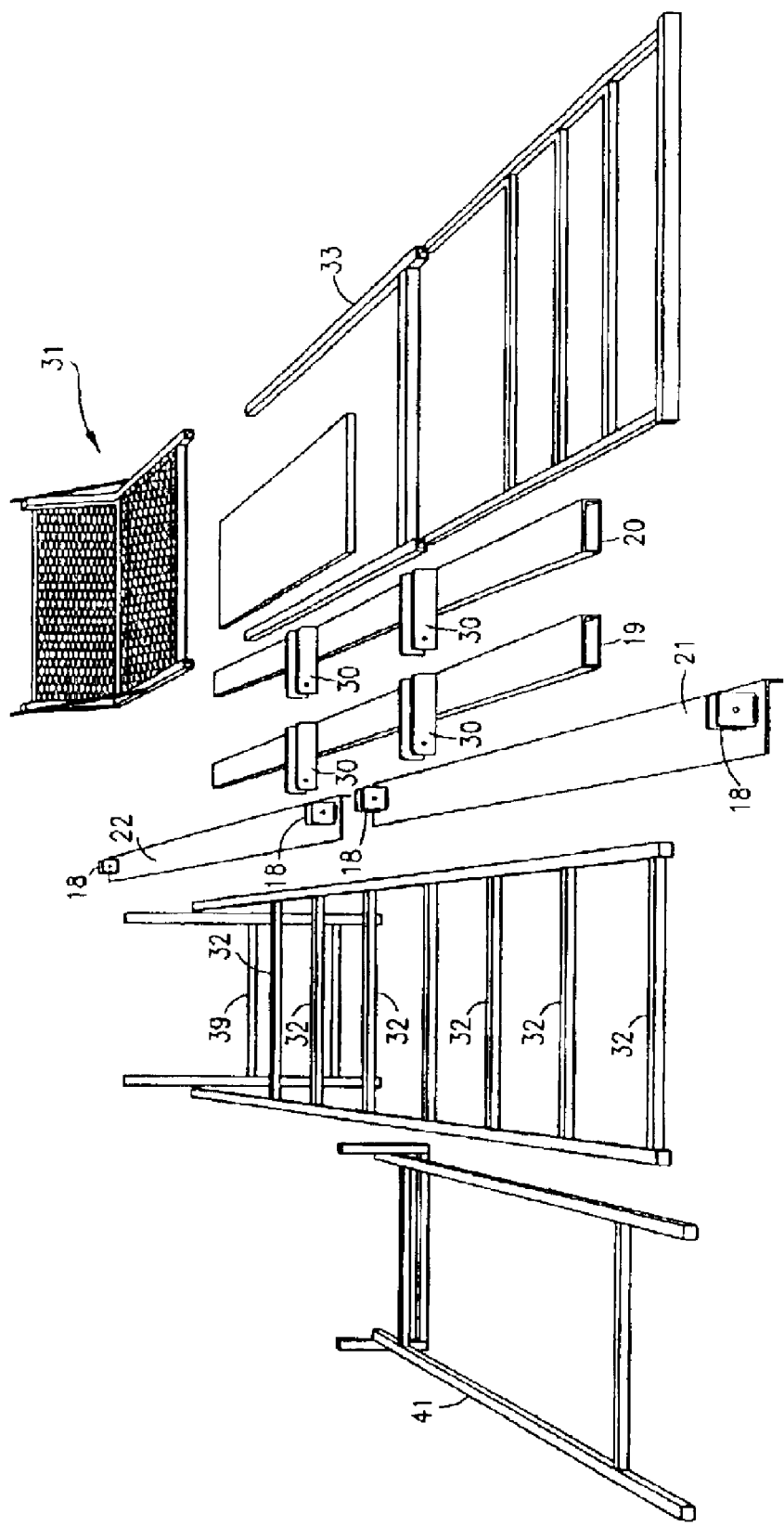
FIG. 4 is a perspective view of various parts of the tower structure and its support member before being assembled.

One preferred method for assembling the observation tower along with its support members is described herein below with reference to FIG. 4. The process of assembling the tower can begin by positioning (i.e., mounting) each of the two angle beam members 21 and 22 onto the side rails 15 and 16 of truck 10, which can best be seen in FIG. 1. Thereafter, front and rear channel members 19 and 20 are positioned on angle beam members 21 and 22 and secured in place by aligning an opening 26 (see FIG. 1) on the channel members with an opening 26 on plate member 18 and inserting a threaded bolt fastener through both openings to secure the support member 12A for the tower in place. Thereafter, the seat and backrest section 31 is secured to that part of the tower structure 41 that forms the rear part of the ladder 34 (see FIG. 3) for the tower to form a stepladder and folding platform. That portion of the tower structure which includes the ladder steps 32 and a footrest member 39 is then secured to the folding seat member 31, forming a basic tower structure. The four leg members 29 of the tower structure are then secured to the channel members 19 and 20 by clip devices 30 (see FIG. 1). Thereafter, the safety rail 33 is then mounted to the folding seat member 31. An optional removable storage platform or a removable tabletop could then be secured to the tower.

The tower system in accordance with the features of the present invention allows for the use of the pickup truck cargo space to carry a full cargo load while the tower system lies in place within the truck, i.e., in either an upright or collapsed position. The tower system, including both the tower structure 12 itself and the support structure 12A which enables the tower to be releasably secured to the truck, can be removed from the pickup truck in a fully assembled condition for storage, or disassembled to save storage space.

Figure 5:
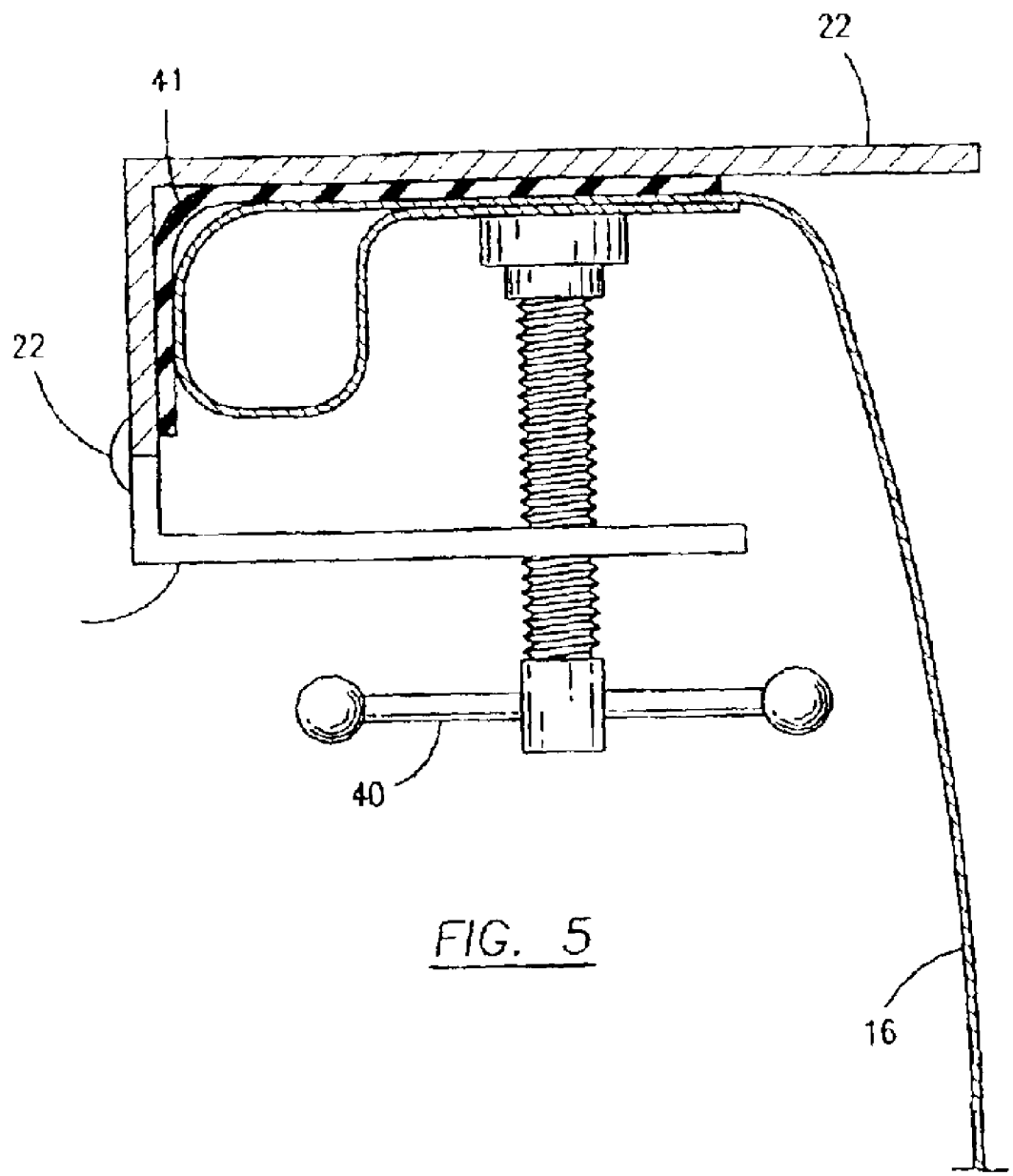
FIG. 5 is an end elevational view, partially in cross section, of an end portion of a support member which is secured to a side wall of a truck cargo area by a clamp in accordance with the features of the present invention.

FIG. 5 illustrates one particular example of a mechanism illustrating how the support member 12A can be releasably secured to the body of a truck. Illustrated in cross section is an angle channel member 22, preferably a right angle member, which is shown secured to the body side section 16 of a truck by a clamp screw arrangement 40. To prevent the channel member 22 from damaging the truck body when it is forced into contact with the truck cargo side wall 16, a rubber mat 41 is preferably positioned between the angle channel member 22 and the truck body 16 during the time that the angle channel member 22 is clamped by the clamp screw 40 to the truck body 16.

The present invention has been shown and described herein in what is considered to be the most practical and preferred embodiment. It is recognized, however, that departures may be made therefrom within the scope of the invention and that obvious modifications will occur to a person skilled in the art.

What is claimed is:

1. An observation system removable mountable on top of a pickup truck cargo bed without permanently altering the truck bed comprising; a foldable chair having a horizontal seat and a vertical back, said horizontal seat having frame members on each side; a tower including a vertical A-frame ladder having a top and bottom, said chair horizontal seat frame mounting members connected to the top of said A-frame ladder; a tower support framework including first and second parallel L-shaped bars, each L-shaped bar having a forward end and a rear end; said tower support framework including front and rear parallel elongated tubular channel bars, each bar having a rectangular cross-section and a plurality of positioning apertures laterally spaced at each end of the bars; an upstanding apertured plate member attached to each end of the L-shaped bars; threaded fasteners connecting the channel bars to said L-shaped bars through an a respective aperture in each upstanding plate member and a selected on of said plurality of laterally spaced positioning apertures in the channel bars, each channel bar having a pair of spaced U-shaped channel clevis secured thereon; said first and second L-shaped bar being parallel and adjustable in separation by selection of the threaded fasteners in one of the positioning apertures to allow the support framework to be fitted to a variety of truck beds of different widths, with the first and second L-shaped bars being positioned to be against the truck bed walls; said tower A-frame ladder including a first vertical, rectangular frame having a plurality of horizontal ladder rungs spaced apart vertically and a second rectangular frame substantially the same size as the first rectangular frame, said first rectangular frame and said second rectangular frame each having upper ends pivotally connected to said chair horizontal seat frame mounting members, and the first and second rectangular frame each having bottoms, the bottom of said first rectangular frame connected to the channel front bar by clevis pins through the bottom and the pair of U-shaped channel clevis on the front channel bar, and the bottom of said second rectangular frame connected to the rear channel bar by clevis pins through the bottom of the second rectangular frame and the pair of U-shaped channel clevis on the rear channel bar, and first and second screw clamps for connecting said first L-shaped bar and said second L-shaped bar to a pickup truck cargo bed side walls; and said tower can be manually altered from a vertically raised position for observation to a collapsed, stored position with said second rectangular frame member positioned parallel against said first rectangular frame member.

* * * * *